United States Patent Office 3,337,610
Patented Aug. 22, 1967

3,337,610
PRODUCTION OF ETHYL ACRYLATE
Frederick James Bellringer, Leatherhead, Peter Bertram Brindley, Redhill, and Christopher John Brown, Walton-on-the-Hill, Tadworth, England, assignors to The Distillers Company Limited, Edinburgh, Scotland, a British company
No Drawing. Filed Oct. 5, 1964, Ser. No. 401,644
Claims priority, application Great Britain, Dec. 2, 1960, 41,453/60
7 Claims. (Cl. 260—486)

The present invention relates to the production of ethyl acrylate and is a continuation-in-part of our copending application Serial No. 154,024, filed Nov. 21, 1961, now abandoned.

According to the present invention the process for the production of ethyl acrylate comprises continuously feeding a mixture containing acrylic acid and at least one mole of ethanol per mole of acrylic acid into a reactor, producing a mixture containing ethyl acrylate and polymeric material maintained at an elevated temperature and containing an acid catalyst, continuously distilling overhead, in the presence of an entrainer selected from the group consisting of ethyl acetate and ethyl acrylate in amounts ranging from about 0.2 to about 5 moles per mole of acrylic acid, a fraction containing ethyl acrylate entrainer and substantially all of the water produced in the esterification and introduced into the feed during esterification, removing a liquid stream from the mixture in the reactor, treating said removed liquid stream to separate polymeric material and recycling said liquid stream to the reactor so as to control the concentration of polymeric material within the range 5–15% by weight based on the total weight of the reactor contents.

The liquid stream removed from the reactor may be treated in any suitable manner in order to separate the polymeric material. In practice the use of a film evaporator for this purpose has been found particularly advantageous. The control of the concentration of polymeric material within the reactor within the above range is particularly critical for the following reasons:

Firstly that the polymer acts as a diluent in the reaction system and is as a consequence undesirable since the rate of esterification is thus reduced as compared with a diluent free system and secondly the presence of large amounts of polymeric materials exert an autocatalytic effect on the unsaturated materials present in the system which leads to increased losses of monomers.

In the development of the process of the present invention it has been found that where polymer concentration in the reactor exceeds about 20% serious polymerisation appears to occur. On the other hand it is not found practicable to reduce the polymer concentration in the reactor to zero since such operation would require the removal of too large a volume of liquid from the reactor for treatment in, for example, a film evaporator. Moreover, the treatment of such a large volume of liquid would require a correspondingly larger film evaporator which is an expensive item of equipment both as regards capital and operating costs. As a consequence it has been found that the optimum range of permissible concentration of polymer in the reactor is within the above quoted range.

The temperature at which the reaction takes place is such that the ethyl acrylate together with substantially all of the water formed in the reaction and that introduced with the feed distil from the reaction mixture in the substantial absence of acrylic acid. It is stressed that this condition represents an essential feature of the process according to the present invention and that without maintaining a strict observance of such conditions the reaction system will not operate in a satisfactory manner.

The acid catalyst employed in the reaction is preferably sulphuric acid which may suitably be present in an amount within the range 0.5% to 5% by weight of the reactor contents.

The mixture of acrylic acid and ethanol fed to the reactor contains at least one mole and preferably about two moles of ethanol, per mole of acrylic acid.

In accordance with one particular embodiment of the invention, removal in the overhead fraction of substantially all of the water formed in the esterification together with water introduced into the reactor mixture with the starting materials, may be facilitated by the addition of an entrainer which may be ethyl acetate and/or ethyl acrylate. The entrainer may be recovered from the overhead fraction and recycled to the reactor.

The proportion of entrainer added preferably varies between 0.5 and 1.5 moles per mole of acrylic acid.

In one method of carrying out the invention employing ethyl acetate as entrainer, ethyl acrylate together with ethanol, water and ethyl acetate are continuously removed overhead in the distillate fraction, while a liquid fraction is continuously withdrawn from the reactor and is treated to separate volatile material from polymeric materials, the volatile material being returned to the kettle. The volatile material may be recovered from the mixture withdrawn from the reactor, for example, by evaporation in a film evaporator. The concentration of catalyst in the reactor is maintained by addition of further quantities as required.

In a preferred embodiment the feed to the reactor comprises a mixture of acrylic and acetic acids, so that by reaction with the ethanol also present the desired ethyl acetate entrainer is produced. At least part of such ethyl acetate finally recovered from the overhead distillation is preferably recycled to the reactor as entrainer.

Ethyl acrylate and ethyl acetate entrainer may be recovered from the overhead fraction from the reactor by any suitable method, for example, by extractive distillation in the presence of suitable solvents or by the addition of a substance which is capable of forming a low boiling azeotrope with one of the components of the mixture and subsequent removal of that azeotrope by distillation. For example, ethanol and water, and the ternary azeotrope of benzene, ethanol and water may be distilled off.

One preferred method of recovering ethyl acrylate together with ethyl acetate, if present, from such an overhead distillation fraction containing also ethanol and water, comprises extracting the fraction with water, suitably by a countercurrent extraction technique. The oil phase contains ethyl acrylate and ethyl acetate and substantially no ethanol. Ethyl acrylate and ethyl acetate may be separated and recovered substantially pure by fractional distillation of the oil phase. Ethanol containing traces of ethyl acrylate and ethyl acetate, may be recovered from the aqueous phase and is suitable for recycle to the reactor.

The ethyl acetate is returned to the reactor if desired. Ethyl acrylate or mixtures of ethyl acrylate/ethyl acetate may be employed as entrainer in place of the ethyl acetate alone.

Use of an entrainer in accordance with the particular embodiment of the present invention provides a means for the continuous overhead removal of water which would otherwise accumulate in the reactor and moreover facilitates the recovery of ethyl acrylate product in the subsequent extraction and distillation stages.

The process of this invention is further illustrated by the following examples.

Example 1

19.5 kilograms of a mixture of 44% by weight of ethanol, 48% by weight of acrylic acid, 2% by weight of acetic acid and 6% by weight of ethyl acrylate were fed to a reactor having a volume of one litre and fitted with a distillation column and means for taking off part of the reactants continuously from the reactor. The reactor contained 2% by weight of sulphuric acid added as an ethanol solution based on the total weight of reactants therein and this concentration was maintained throughout. The temperature in the reactor was maintained at 90° C., and the nominal residence time of the reactants was 3 hours.

18 kilograms of a distillate containing 32% by weight of ethanol, 47.7% by weight of ethyl acrylate, 11.3% of water and 9% of ethyl acetate was taken off overhead from the reactor. This distillate was passed countercurrent to an equal weight of water in a packed column and the oily product was separated. This product, amounting to 46.5% by weight of the original distillate, contained 0.06% by weight of ethyl ether, 0.08% by weight of ethanol, 8.1% by weight of ethyl acetate, 91.7% by weight of ethyl acrylate and 1.3% by weight of water. The aqueous raffinate contained 0.004 mole/kg. of acid and 0.35 mole/kg. of esters together with the remainder of the ethanol.

During the reaction, 3.6 kilograms of the reaction mixture was removed as liquid from the reactor in a continuous manner, and this contained 4.5 mole/kg. of acid and 4.95 mole/kg. of esters. Removal of such mixture maintained the polymer concentration at 13% w./w. 3.3 kilograms of this material was passed down a film evaporator maintained at 100° C. and 100 mm. Hg pressure, and a pale yellow distillate weighing 2.2 kilograms was obtained, which contained 35.5% by weight of ethyl acrylate, 42.5% by weight of acrylic acid, 16% by weight of ethanol and ethyl acetate, 0.3% of acetic acid, and 5.7% of high boilers on a water free basis.

The following example illustrates the use of an entrainer in accordance with the particular embodiment of the present invention.

Example 2

A mixture of 1 mole of acrylic acid, and 2 moles of ethanol containing 4.5% w./w. water, together with 0.3 to 1.25 moles of ethyl acetate containing 3% of water, recycled after purification from the overhead fraction, was fed to a reactor. The reactor was fitted with a distillation column and means to bleed off part of the reactants continuously from the reactor, and for recycle of ethyl acetate and ethanol from the overhead fraction after separation. The nominal residence time of the reactants was 3 hours and the reactor was operated at 90° C. the concentration of sulphuric acid in the reactor was maintained at 4% w./w.

The composition of the overhead fraction was determined at intervals and the results are shown in Table 1.

TABLE 1

| Run Duration, hrs. | Snap Distillate Analyses, Percent w./w. | | | | | |
|---|---|---|---|---|---|---|
| | 39 | 51 | 63 | 67 | 73½ | 88 |
| Components: | | | | | | |
| Ethanol | 18.1 | 18.3 | 18.8 | 19.8 | 12.7 | 17.5 |
| Ethyl acetate | 35.7 | 27.7 | 30.1 | 21.2 | 30.4 | 29.2 |
| Do | 37.1 | 42.4 | 40.4 | 48.3 | 46.4 | 42.1 |
| Water | 9.2 | 11.6 | 11.1 | 10.6 | 10.6 | 11.3 |
| Mole ethanol/ratio: Ethyl acrylate | 1.06 | 0.93 | 1.02 | 0.89 | 0.6 | 0.90 |

During operation of this example the concentration of polymer in the reactor was maintained within the range 7.7 to 12.3% w./w., by withdrawing a stream for this purpose.

Example 3

A mixture of 47.5% w./w. ethanol, 5.0% ethyl acetate, 2.2% w./w. ethyl acrylate, 39.3% w./w. acrylic acid, together with 6.0% of water was fed to the reactor at the rate of 250 ml./hr. The mole ratio of ethanol:acrylic acid in the feed was 1.9. Ethyl acetate, containing 2% w./w. water, was also fed to the reactor at the rate of 125 ml./hr. to act as a water entrainer, while a bleed of 75 ml./hr. was taken from the reactor to avoid build-up of polymeric materials. This bleed was passed through a film evaporator, operating at 195° C. and atmospheric pressure, and the distillate containing mainly ethanol, ethyl acrylate and acrylic acid was fed directly back to the reactor. The stirred reactor was fitted with a short rectification column and a reflux ratio of 3:2 was used with a reaction temperature of 87.5° C. The concentration of sulphuric acid in the reactor was maintained at 4% w./w. The nominal residence time of the reactants, including the feed of entrainers, was 2½–3 hours.

During a continuous run of 143 hours, 27.22 kg. of the acid/ethanol feed, together with 12.68 kg. of ethyl acetate and 0.5 kg. of sulphuric acid, was passed to the reactor. 1.01 kg. of film evaporator residue was collected containing approx. 5.7 mole of acrylic acid/ethyl acrylate polymer. 38.89 kg. of reactor distillate was produced containing 143.9 moles of ethyl acrylate (97% yield) made from the 147.3 moles of acrylic acid fed.

The following table gives some bulk distillate analyses taken during the run:

TABLE 2

| Duration, hrs. | 28–31 | 37–43 | 55–61 | 79–85 | 91–96 | 135–140 |
|---|---|---|---|---|---|---|
| Component: | | | | | | |
| Ethanol | 15.89 | 16.35 | 16.99 | 16.42 | 15.85 | 15.61 |
| Ethyl acetate | 35.30 | 34.17 | 34.19 | 37.11 | 35.73 | 37.10 |
| Do | 39.01 | 39.08 | 34.43 | 36.27 | 37.64 | 36.60 |
| Water | 9.8 | 10.4 | 10.4 | 10.2 | 10.75 | 10.7 |
| Mole ethanol/ratio: Ethyl acrylate | 0.88 | 0.91 | 0.96 | 0.98 | 0.91 | 0.93 |

During the complete operation of this example the concentration of the polymer in the reactor was maintained within the range 6.3 to 9.4% w./w.

The mole ratio of ethanol to ethyl acrylate found in the distillate was closed to 0.95, that expected from a 97% conversion of acrylic acid to ethyl acrylate. The absence of any build-up of water within the system indicated that the water formed, together with that in the feed, was removed from the reactor in the distillate.

We claim:

1. A process for the production of ethyl acrylate which comprises continuously feeding a mixture containing acrylic acid and at least one mole of ethanol per mole of acrylic acid into a reactor, maintained at an elevated temperature and containing an acid catalyst, forming ethyl acrylate, water and polymer, continuously distilling overhead in the presence of an entrainer selected from the group consisting of ethyl acetate and ethyl acrylate in amounts ranging from about 0.2 to about 5 moles per mole of acrylic acid, a fraction containing ethyl acrylate entrainer and substantially all of the water produced in the esterification and any water introduced into the feed during esterification, removing a liquid stream from the mixture in the reactor, evaporating said removed liquid stream to separate polymeric material and recycling said liquid stream to the reactor so as to control the concentration of polymeric material within the range 5–15% by weight based on the total weight of the reactor contents.

2. A process as claimed in claim 1 wherein the ethyl acrylate and entrainer are recovered from the overhead fraction by the addition of benzene and a benzene/ethanol/water tertiary azeotrope separated by distillation.

3. A process as claimed in claim 1 wherein the proportion of entrainer is between 0.5 and 1.5 moles per mole of acrylic acid.

4. A process as claimed in claim 1 wherein the overhead fraction is extracted with water, and the oil phase is separated and subjected to fractional distillation to recover ethyl acrylate and entrainer.

5. A process as claimed in claim 1 wherein the entrainer is ethyl acetate at least a proportion of which is provided by the presence of acetic acid in the acrylic feed to the reactor.

6. A process as claimed in claim 1 carried out at a temperature of about 90° C.

7. A process as claimed in claim 1 wherein the mixture of acrylic acid and ethanol fed to the reactor contains about 2 moles of ethanol per mole of acrylic acid.

References Cited

UNITED STATES PATENTS

| | | | |
|---|---|---|---|
| 1,998,413 | 4/1935 | Reppe et al. | 260—486 |
| 2,333,756 | 11/1943 | Wentworth | 260—541 |
| 2,649,475 | 8/1953 | Bellringer et al. | 260—486 |
| 2,987,542 | 6/1961 | Modiano | 260—486 |
| 3,006,950 | 10/1961 | Weiss et al. | 260—486 |
| 3,264,347 | 8/1966 | Sennewald et al. | 260—486 X |

LORRAINE A. WEINBERGER, *Primary Examiner.*

A. P. HALLUIN, *Assistant Examiner.*

UNITED STATES PATENT OFFICE
CERTIFICATE OF CORRECTION

Patent No. 3,337,610                          August 22, 1967

Frederick James Bellringer et al.

It is hereby certified that error appears in the above numbered patent requiring correction and that the said Letters Patent should read as corrected below.

Column 2, line 53, after "phase" insert -- obtained --; column 3, TABLE 1, first column, line 4 thereof, for "Do" read -- ethyl acrylate --; column 4, TABLE 2, first column, line 4 thereof, for "Do" read -- ethyl acrylate --; same column 4, line 47, for "closed" read -- close --.

Signed and sealed this 27th day of August 1968.

(SEAL)
Attest:

Edward M. Fletcher, Jr.                        EDWARD J. BRENNER
Attesting Officer                              Commissioner of Patents